US011661274B1

United States Patent
Patel et al.

(10) Patent No.: US 11,661,274 B1
(45) Date of Patent: May 30, 2023

(54) CONTAINER TRANSPORTERS

(71) Applicant: Amazon Technologies, Inc., Seattle, WA (US)

(72) Inventors: Kushal Patel, Seattle, WA (US); William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 17/098,604

(22) Filed: Nov. 16, 2020

(51) Int. Cl.
*B65G 1/04* (2006.01)
*B25J 15/00* (2006.01)
*B65G 1/137* (2006.01)
*B25J 13/08* (2006.01)
*B25J 9/00* (2006.01)

(52) U.S. Cl.
CPC .......... *B65G 1/0435* (2013.01); *B25J 9/0096* (2013.01); *B25J 13/08* (2013.01); *B25J 15/0014* (2013.01); *B25J 15/0019* (2013.01); *B65G 1/1373* (2013.01)

(58) Field of Classification Search
CPC ........ B25J 13/08; B25J 9/0096; B65G 1/0435
See application file for complete search history.

(56) References Cited

U.S. PATENT DOCUMENTS

2008/0281717 A1* 11/2008 Kortelainen ......... B65G 1/1371
705/28
2017/0137221 A1* 5/2017 Koide ................. B65G 1/0492

OTHER PUBLICATIONS

U.S. Appl. No. 16/751,084, filed Jan. 23, 2020, titled Container Transporter.

* cited by examiner

*Primary Examiner* — Saul Rodriguez
*Assistant Examiner* — Willie W Berry, Jr.
(74) *Attorney, Agent, or Firm* — Eversheds Sutherland (US) LLP

(57) ABSTRACT

Systems, methods, and computer-readable media are disclosed for container transporters and related item manipulation devices. In one embodiment, an example item manipulation device may include a support platform, and a conveyance surface attached to the support platform and configured to convey a container at least a portion of a distance from a first side of the support platform to a second side of the support platform, where the conveyance surface defines at least a portion of a container passage through which a container can be conveyed. The item manipulation device may include a manipulator comprising a first arm disposed along a longitudinal axis of the item manipulation device and a second arm disposed along the longitudinal axis of the item manipulation device, where the manipulator is engageable with the container to move the container at least partially onto the conveyance surface.

19 Claims, 12 Drawing Sheets

CONTAINER TRANSPORTERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
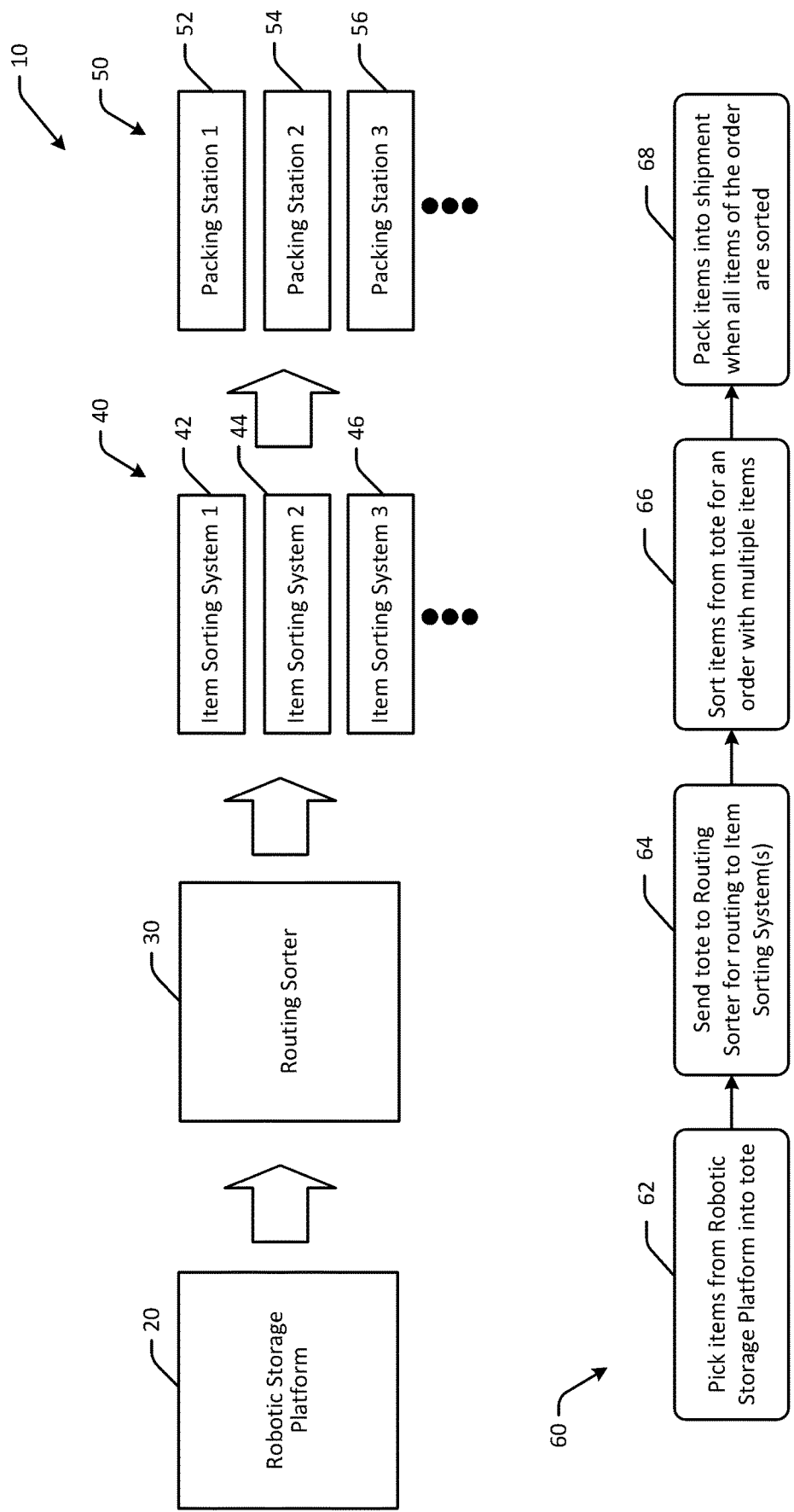
FIG. 1 is a hybrid schematic illustration of an example use case for container transporters and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Incorporation by Reference

This case incorporates by reference U.S. Ser. No. 16/751,084, filed Jan. 23, 2020 and titled "Container Transporter," which describes a number of different use cases and applications for container transporters. The embodiments described herein may be used, in addition to other uses, instead of the container transporters described in the '084 application to perform the various functions and/or in the various applications set forth in the '084 application. The '084 application is therefore hereby incorporated by reference.

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with ease. However, robotic handling of items may require various levels of dexterity. Similarly, moving containers that include one or more items inside may be difficult as well. For example, retrieving a container, securing the container, and transporting the container may be easy for a human, but may be difficult for robotic handling due to the potential for items to move within the container during transport, changes in center of gravity, and so forth.

Embodiments of the disclosure include methods and systems for automated handling of items and objects regardless of packaging that may improve processing and fulfillment of orders, or other object aggregation tasks. Certain embodiments include robotic manipulators, such as robotic arms, that are configured to grasp and securely handle and transport containers, so as to increase throughput and speed of container movement. Some embodiments may be configured to pick and place containers from one container pod to another, which may require precise movement to direct containers into container slots in a container pod. Some embodiments include optimized process flows for processing of orders at fulfillment centers, as well as process flows or methods to increase speed of transporting containers as a result of improved speed in handling containers. As a result, throughput of fulfillment centers may be improved, and/or logistics of fulfillment center operations may be less complicated.

Referring to FIG. 1, an example use case 10 for container transporters and an example process flow in accordance with one or more embodiments of the disclosure. Although discussed in the context of online orders, other embodiments may be directed to any suitable use case where products or containers are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 20, a routing sorter 30, one or more item sorting systems 40, and one or more packing stations 50. The robotic storage platform 20 may be a portion of the fulfillment center at which products picked from product inventory are placed. Inventory may be stored in containers in flexible container pods in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 20, such as via a conveyor belt. In the illustrated embodiment, products at the robotic storage platform 20 may be placed in a container, such as a tote. The tote may optionally be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 30, totes including products that have been picked may be routed to the appropriate or designated item sorting system. For example, the routing sorter 30 may optionally determine an identifier associated with the tote, and may determine one or more item sorting systems to which the tote is to be routed using the identifier or using another factor, such as sortation system load. The routing sorter 30 may route or direct the tote to an item sorting system.

The item sorting systems 40 may include one or more item sorting system machines. In FIG. 1, a first item sorting system 42, a second item sorting system 44, a third item sorting system 46, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 40, totes that are received via the routing sorter 30 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 50. In some embodiments, one or more packing stations may be included. In some instances, a packing station may service more than one item sorting system, while in other instances, more than one packing station may service one item sorting system. In the illustration of FIG. 1, a first packing station 52 may be used to pack orders from the first item sorting system 42, a second packing station 54 may be used to pack orders from the second item sorting system 44, a third packing station 56 may be used to pack orders from the third item sorting system 46, and so forth. At the packing stations 50, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 60 illustrated in FIG. 1 may be implemented to improve the efficiency and/or throughput of the fulfillment center. At a first block 62, items may be picked from the robotic storage platform 20 into a tote that may optionally be associated with a specific item sorting system. At a second block 64, the tote may be sent to the routing sorter 30 for routing to an item sorting system. At a third block 66, the items from the tote may be sorted for an order with multiple item by the specific item sorting system. At a fourth block 68, the items may be packed into a shipment when all of the items in the order are sorted.

Embodiments of the disclosure include container transporters. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other container transporters, the container transporters described herein may securely grasp and handle containers without the use of suction, and may provide control over containers during transport, with repeatable performance Certain embodiments may be configured to automatically load and unload containers in a safe and efficient manner.

Embodiments of the disclosure may therefore provide an end of arm tool for use with robotic manipulators or other equipment to pick and place containers in pods or any other tote storage facility. End of arm tools may be configured to exchange totes between pods and/or between a pod and a conveyor. Certain embodiments eliminate use of a suction cup and hence also eliminate the necessity of air lines (e.g., if rotary grippers are powered by electric actuators) and also eliminates the issue of suction cup maintenance and periodic replacement.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
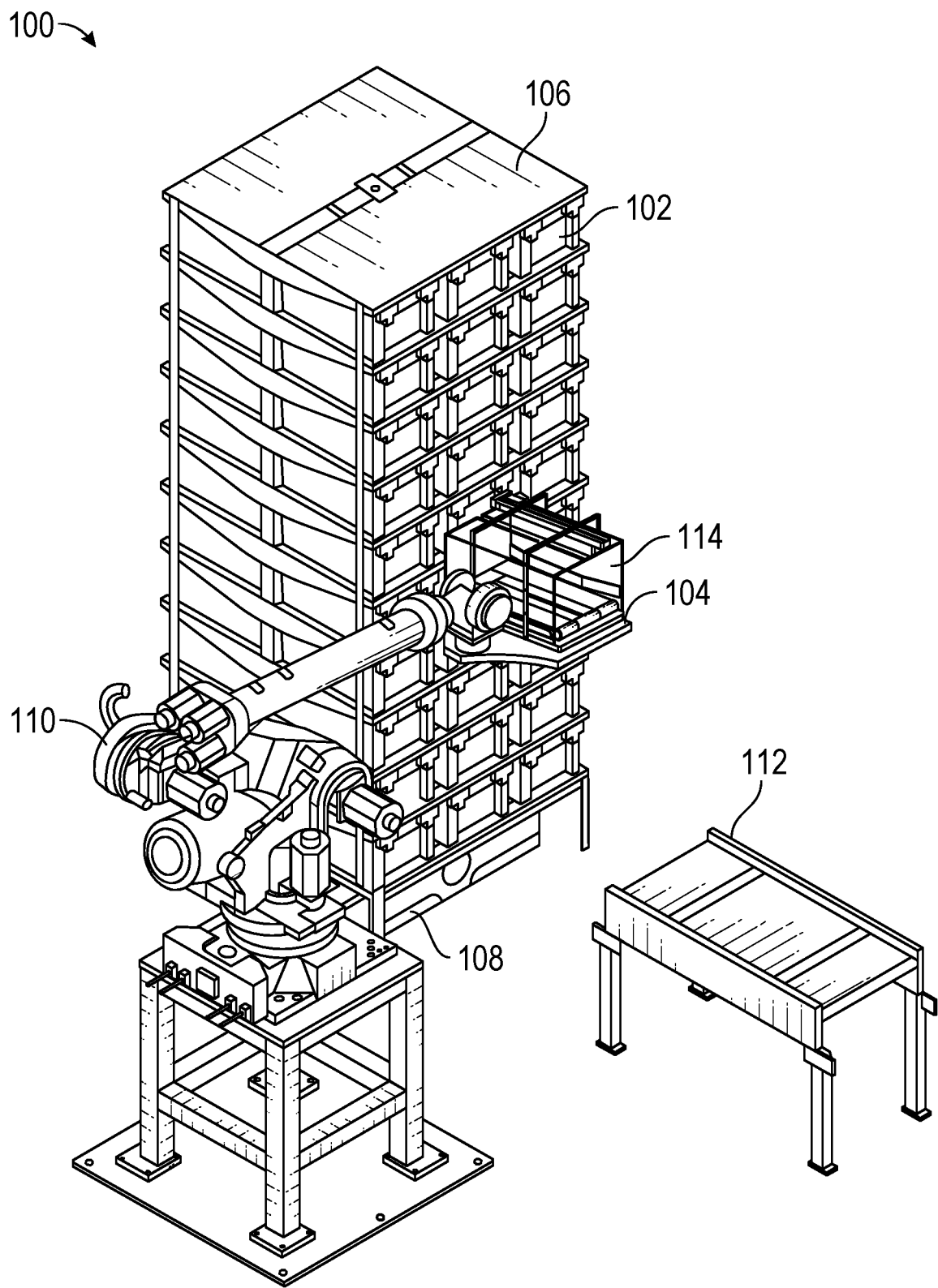
FIG. 2 is a schematic illustration of an example container management system for moving and managing containers in accordance with one or more embodiments of the disclosure.

FIG. 2 is a schematic illustration of an example container management system for moving and managing containers in accordance with one or more embodiments of the disclosure. Other embodiments may include additional or fewer components. The illustration of FIG. 2 may not be to scale, and may not be illustrated to scale with respect to other figures. The robotic picking assembly configured to grasp multiple items illustrated in FIG. 2 may be used throughout the fulfillment center environment discussed with respect to FIG. 1.

In the example of FIG. 2, a container transport can include a support platform that may be connected to a robotic manipulator (e.g., a robot arm). The robotic manipulator can position the container transport for engaging with a container and loading that container onto the container transport. A container manipulator (e.g., one or more actuatable rods used to push and/or pull containers) may be mounted to the container transport. The container manipulator can engage with the container (e.g., via one or more arms) and move in order to position the container on the container transport, for example, on a container conveyor such as a belt or set of rollers. The container transport may move the container via the container conveyor to a position where the container is completely or almost completely on the container conveyor. The container conveyor can hold the container in place while the robotic manipulator moves the container transport to a position for unloading the container. The container conveyor may unload the container onto an unloading station via the container conveyor and/or the container manipulator. For example, during operation, after the container manipulator has pulled a container onto the container conveyor, the container manipulator may include fingers that can be rotated upwards or to a vertical orientation to allow the container to be unloaded at the destination.

In FIG. 2, a container management system 100 for moving and managing containers 102 using a container transport 104 is depicted, according to at least one example. As described herein, containers 102 can be positioned in a container holder 106. The container holder 106 can be moved around a warehouse environment via a mobile drive unit 108, for example. The mobile drive unit 108 can move the container holder 106 to a position for removal of the containers 102, for example, by the container transport 104 attached to a robotic manipulator 110. The container transport 104 can include various components for engaging with and moving the containers 102. The robotic manipulator 110 can position the container transport 104 for loading of a container 102 onto the container transport and move the container and the container transport to a position for unloading the container. The container 102 may pass at least partially through a container passage 114. For example, the container 102 can be received by a first side (e.g., the front) of the container passage 114, pass through the container passage, and exit through a second side (e.g., the rear) of the container passage. However, in some instances, a portion of the container 102 may be partially or fully received by the first side. At least a portion of the container received by the first side may exit back through the first side, e.g., such that the container is partially received by the container passage or travels within the container passage without passing through the entirety of the container passage or without passing through an opposite side. The container passage 114 can include one or more of a front, a rear, a top, one or more sides, and a bottom. The container passage 114 may be at least partially defined by a shell and/or a similar casing. The container 102 may be unloaded onto an output station 112 or a device for movement or other processing of the container.

The containers 102 can be or include a container or a bin with an interior area for containing one or more items. The containers 102 may include rigid or semi-rigid material, for example, plastic, cardboard, paper, or any suitable material for containing items. In some embodiments, the containers 102 can include handles, hooks, engagement surfaces, or other features and/or components for engaging with the container transport 104. In further embodiments, the containers 102 may be items, e.g., such that the items are moved by the container transport 104 without first being positioned in a container 102.

Multiple containers 102 can be positioned in the container holder 106. The container holder 106 can include one or more faces for receiving containers 102. The faces can include shelves, walls, compartments, and/or rails for receiving the containers 102. For example, the faces can be positioned in the container holder 106 to arrange containers 102 into vertical columns and/or horizontal rows.

The container holder 106 can be moved by a mobile drive unit 108 around the warehouse environment in some embodiments, although the container holder 106 may additionally or alternatively include or be accompanied by a propulsion system or other system to move the container holder 106. The mobile drive unit 108 can include a propulsion system and engagement components for engaging with the container holder 106. The engagement components can engage with the container holder 106 for movement of the container holder, for example, by lifting the container holder. The mobile drive unit 108 can be manually controlled to move the container holder 106 or can include components for automated movement. For example, the mobile drive unit 108 can include components to automatically move toward and engage with a container holder 106 and move the container holder into a suitable position for interaction with the robotic manipulator 110.

The mobile drive unit 108 can position the container holder 106 near the robotic manipulator 110 for moving, removing, and/or depositing containers 102 relative to the container holder. The robotic manipulator 110 can be or include a robotic arm moveable along multiple axes. For example, the robotic arm can be moveable along six-axes, although any other suitable number greater than or less than six could alternatively be utilized. The robotic manipulator 110 can include one or more attachment points and/or engagement components for attaching to various components. For example, the robotic manipulator 110 can attach to the container transport 104.

In some embodiments, the robotic manipulator 110 can be positioned at a stationary point in a warehouse environment. However, the robotic manipulator 110 may be moveable around the warehouse environment, either under its own power and/or under the power of another device.

The robotic manipulator 110 can move the container transport 104 between a position at or near the container holder 106 and a position at or near the output station 112 or other feature for receiving the container 102. The output station 112 can receive the container 102 for further processing. For example, items can be added and/or removed from the container 102. The output station 112 can be or include a conveyor, motor driven rollers, a processing station for the containers 102, a station for adding and/or removing items, a station for manual handling of the containers, and/or any suitable component or components for handling one or more containers. The output station 112 can receive the containers 102 from the container transport 104 and move the containers to a position in a warehouse environment. For example, the output station 112 can move the containers 102 for further processing. The output station 112 can be or include motor driven rollers, belts, and/or other components suitable for moving containers 102.

Figure 3:
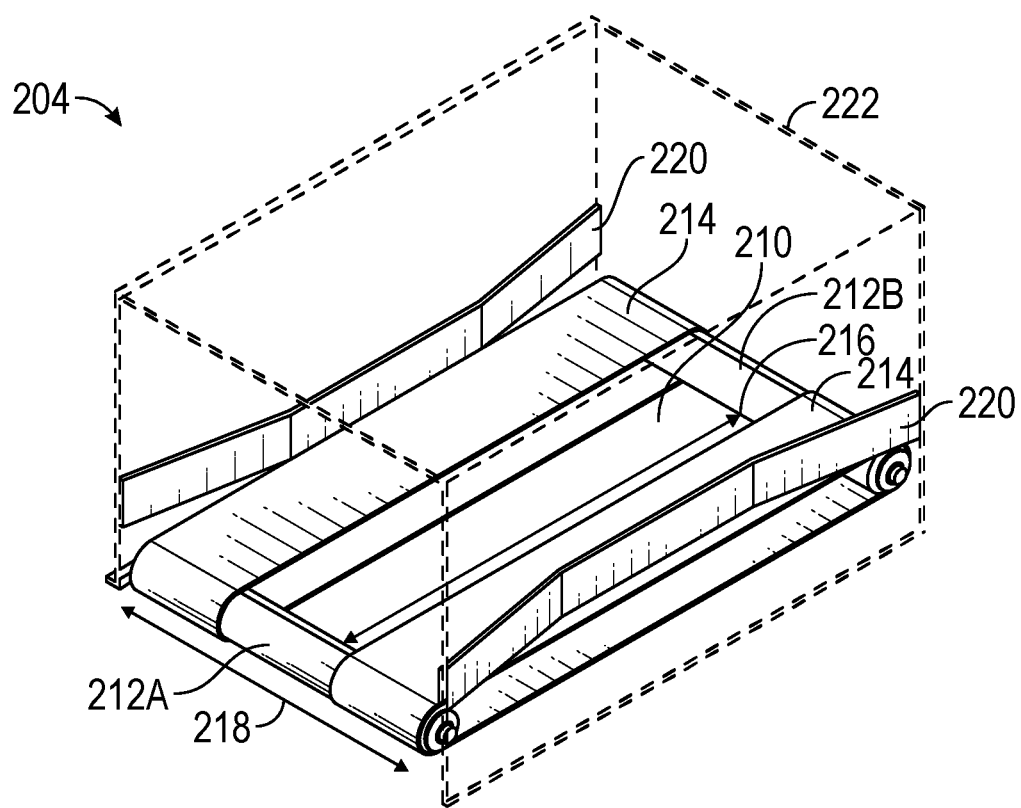
FIG. 3 schematic illustrates an example container transporter in various views in accordance with one or more embodiments of the disclosure.
Figure 3:
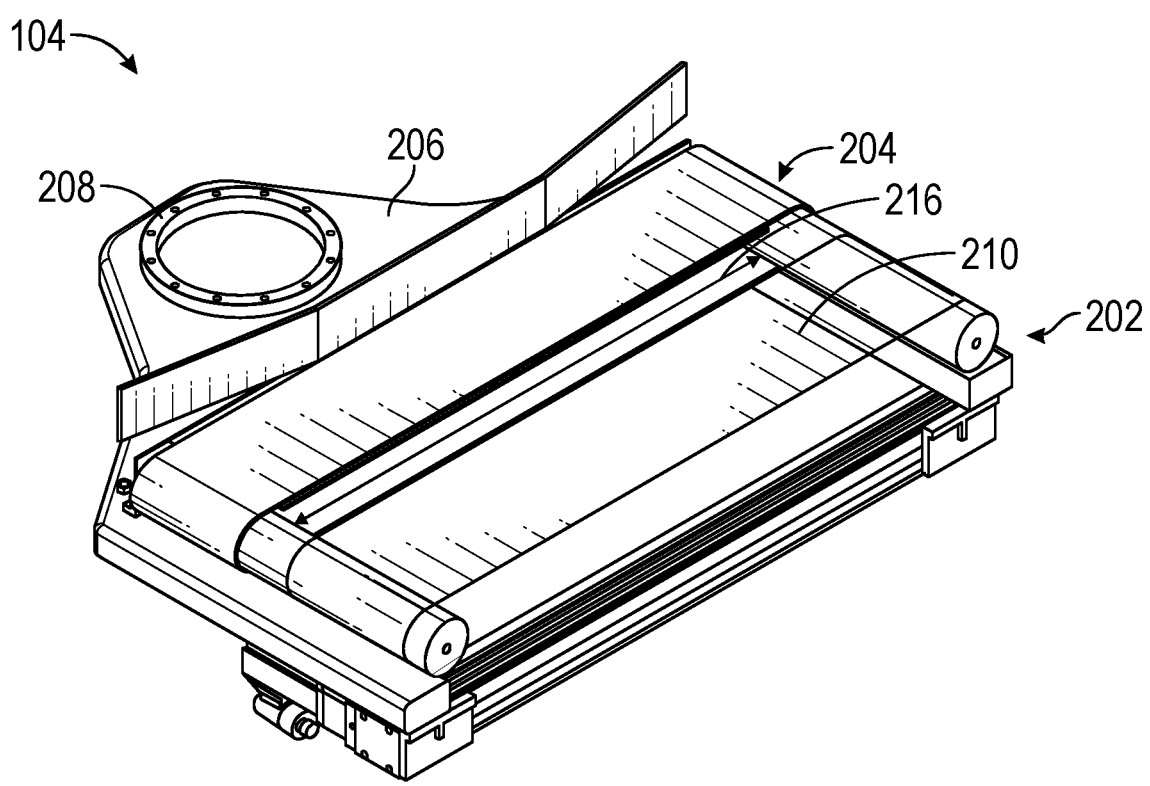

FIG. 3 is a schematic illustration of an example container transporter in various views in accordance with one or more embodiments of the disclosure. Other embodiments may include additional or fewer components. The illustration of FIG. 3 is not to scale, and may not be illustrated to scale with respect to other figures. The container transporter illustrated in FIG. 3 may be the same container transporters discussed with respect to FIGS. 1-2.

In FIG. 3, a perspective view of a portion of an example container transport 104 that can be included in particular embodiments of the container management system 100 of FIG. 1 is shown. The transporter may include the container conveyance assembly 204 that can be included in particular embodiments of the container transport 104 of FIG. 3. The container conveyance assembly 204 can include one or more rollers 212 driving one or more conveyance surfaces 214. The rollers 212 can have a length that occupies at least a part of the width distance 218. The width distance 218 can correspond to the combined width of the one or more conveyance surfaces 214 and the opening 210. The width distance 218 can correspond to the width of the containers 102 or may be a larger or smaller width than the width of the containers. The rollers 212 can be mounted to the support platform 206 and rotate in one or more directions. Some or all of the rollers 212 can be driven by one or more motors. The rollers 212 can be spaced apart from one another by a length distance 216. The length distance 216 can be equal to or greater than the length of containers 102. For example, a container 102 can be positioned on the conveyance surfaces 214 between the two rollers 212.

The one or more conveyance surfaces 214 can be positioned on the rollers 212 and have an upper surface for receiving and conveying the containers 102. The conveyance surfaces 214 can be positioned a length distance 216 apart, optionally forming a gap or opening 210. The conveyance surfaces 214 can be or include a belt, a chain, a roller chain, a plastic chain, a loop of material, for example, rubber or nylon, or any suitable device for supporting and transporting the containers 102. In some embodiments, the container conveyance assembly 204 can include beltless motor-driven rollers for conveying the containers 102. The beltless motor-driven rollers can be driven by one or more motors for moving the containers 102 through the container passage 114. In some embodiments, the conveyance surfaces 214 may be any active surface, such as a surface that includes one or more active drive components. For example, the conveyance surfaces 214 may include one or more driven rollers, one or more driven belts, one or more motor driven surfaces, or another driven surface.

In many embodiments, the container conveyance assembly 204 can include one or more side rails 220 positioned on the sides of the conveyance surfaces 214. The side rails 220 can be sized and shaped to guide the centerline of the containers 102 toward the centerline of the container conveyance assembly 204. For example, the side rails 220 can be positioned further apart at a receiving section of the container conveyance assembly 204 and narrow toward the center of the container conveyance assembly. The side rails 220 can be or include metal or similar material that can withstand the force of a container 102 that is in motion. In some embodiments, the side rails 220 can be used to hold the containers 102 at a center of the container conveyance assembly 204. The side rails 220 may be or include resilient material that can flex to accommodate different sizes of containers 102. In further embodiments, the side rails 220 can be adjustable to accommodate different sizes of containers 102 and/or hold the containers in place on the container conveyance assembly 204.

Figure 7:
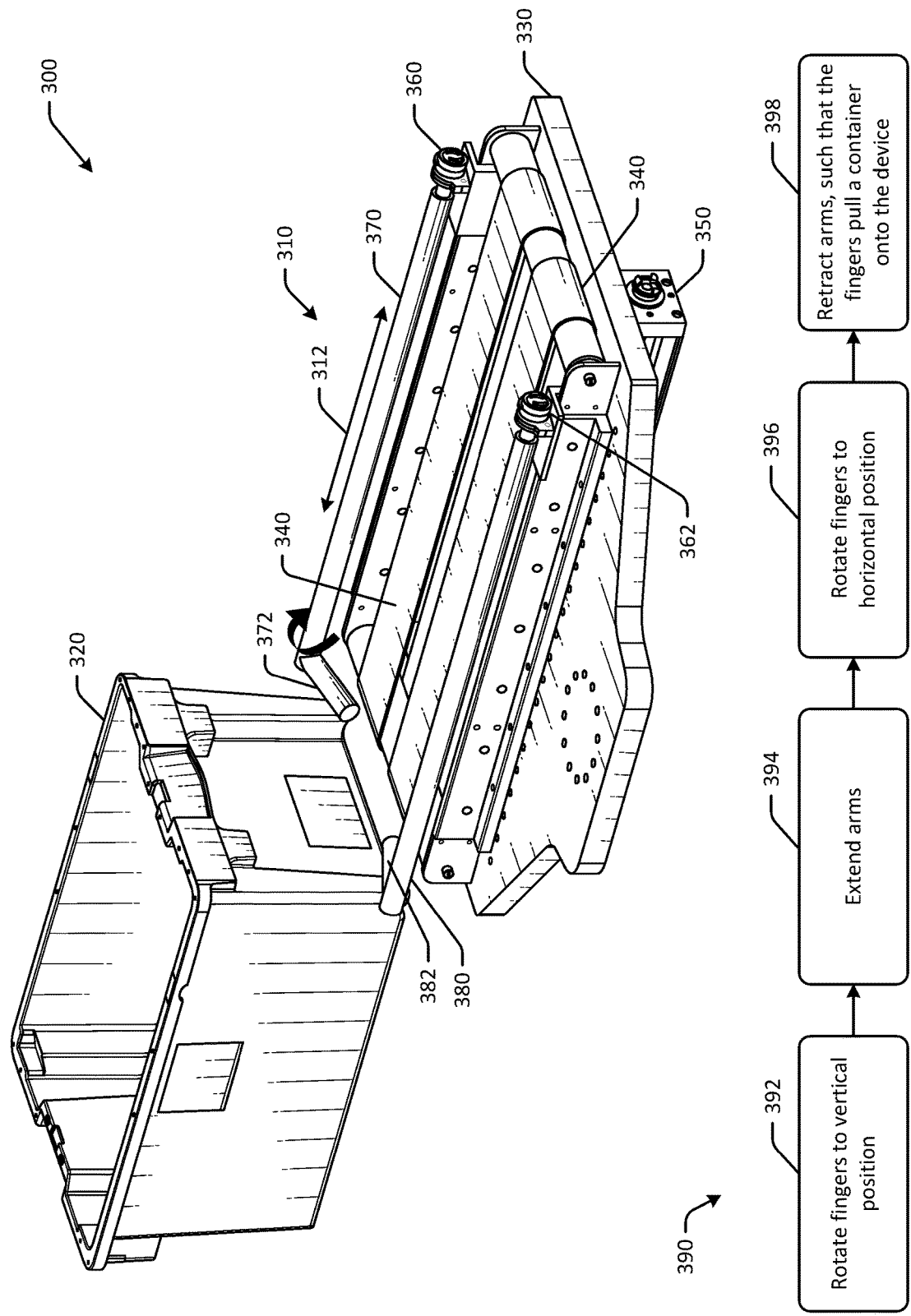
FIG. 7 is a schematic illustration of a container transporter in isolated view with a container in accordance with one or more embodiments of the disclosure.

The container transport 104 can include a container manipulation assembly 202 and a container conveyance assembly 204. The container manipulation assembly 202 may include one or more arms, as illustrated in FIG. 7. The container manipulation assembly 202 can engage with a container 102 and position the container on or otherwise in engagement with the container conveyance assembly 204 for conveyance along the container transport 104. The container manipulation assembly 202 and the container conveyance assembly 204 can be mounted to a support platform 206. The support platform 206 can include one or more gaps or openings 210 in instances where more than one conveyor belt is included, as depicted in FIG. 3. Other embodiments may include a single conveyor belt. The container manipulation assembly 202 may be mounted above and/or to the side of the container conveyance assembly 204.

The support platform 206 can be made of or include material strong enough to support one or more containers 102 positioned on the container transport 104. The support platform 206 can include mounting surfaces for mounting one or more components. For example, the support platform 206 can be a platform with a top mounting surface and a bottom mounting surface for mounting of various components. In some embodiments, the mounting surfaces may include mounting points and/or mounting hardware for the mounting of the various components.

In many embodiments, the support platform 206 includes an attachment point 208 for attaching of the container transport 104 to the robotic manipulator 110. The attachment point 208 can connect with one end of the robotic manipulator 110, such that, the robotic manipulator is able to move the container transport 104. The connection between the robotic manipulator 110 and the attachment point 208 can be strong enough to support the combined weight of the container transport 104 and one or more containers 102. The attachment point 208 can include connection points for coupling power, signal lines, hydraulic lines, pneumatic lines, and/or other suitable connections for elements that may facilitate proper functioning of components incorporated in the container transport 104. The connection points can be used, for example, to connect the container transport 104 to a common power source shared by the robotic manipulator 110. The attachment point 208 can be manually connected to the robotic manipulator 110 or can automatically connect with the robotic manipulator. For example, the attachment point 208 can be or include a quick connect attachment for automatic connection with the robotic manipulator 110.

The container conveyance assembly 204 can define a portion of a container passage 114 for movement of the containers 102. For example, the container conveyance assembly 204 can define the bottom portion of the container passage 114. The containers 102 can be moved along or through the container passage 114 by the container conveyance assembly 204 and/or the container manipulation assembly 202. The container manipulation assembly 202 can move relative to the container passage 114, such by movement back and forth and/or inside and the outside of the container passage 114, being removed from the inside and/or the outside of the container passage, or being relocated between the inside and/or the outside of the container passage. For example, one or more arms of the container manipulation assembly 202 can move outside of the container passage 114 and engage with the container 102. The container manipulation assembly 202 can engage with and/or move the containers 102 when the container manipulation assembly is positioned inside or outside the container passage 114.

As an illustrative example, the container manipulation assembly 202 can include a first arm disposed on a first side of the container conveyance assembly 204, and a second arm on a second side of the container conveyance assembly 204. The arms may move back and forth to pull containers onto the container conveyance assembly 204. The arms may include individual rotatable fingers that can be used to secure a container or apply a force to side of the container to push and/or pull the container. The arms may be rotatable so as to move the respective fingers from a flat position to a raised position, such as from horizontal to vertical. The container manipulation assembly 202 can move laterally to a position to engage with the container 102 (e.g., a position where at least a portion of the container manipulation assembly 202 is outside of the container passage 114). The container manipulation assembly 202 can engage with the container 102 and pull the container 102 at least partially onto the container conveyance assembly 204 (e.g., by moving laterally until the container manipulation assembly 202 is positioned inside the container passage 114). The container 102 can be conveyed through the container passage 114, e.g., from one end of the container transport 104 to another end of the container transport.

Figure 4:
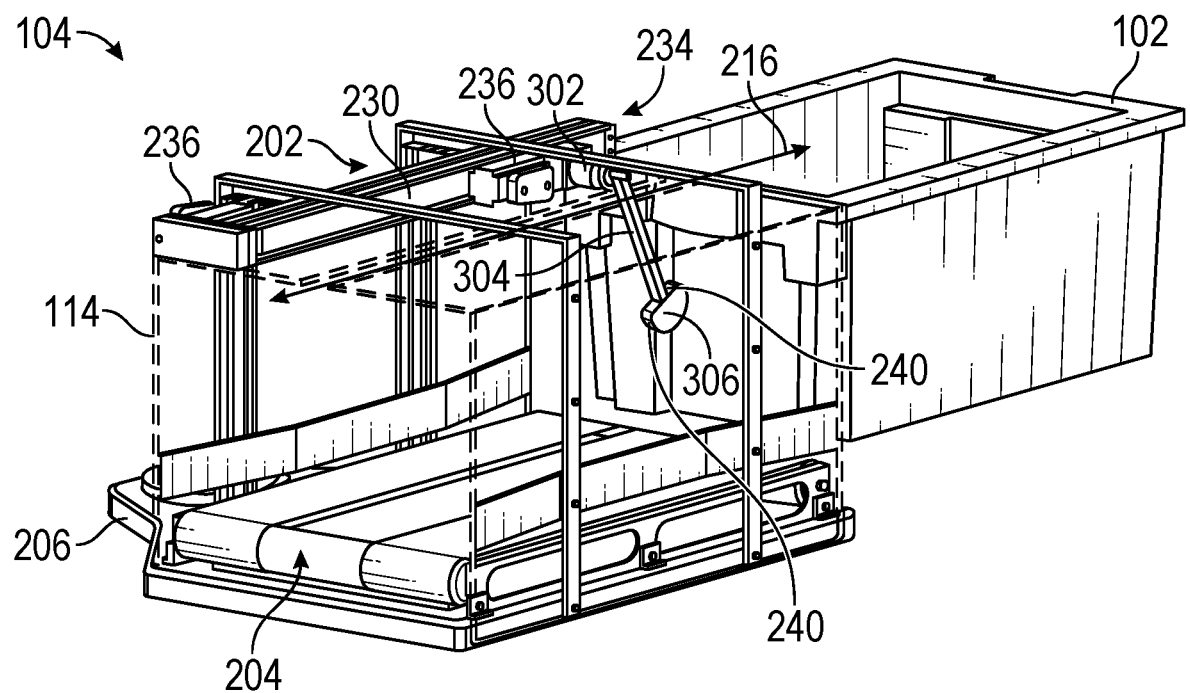
FIG. 4 is a schematic illustration of an example container transporter and a container in accordance with one or more embodiments of the disclosure.

FIG. 4 is a schematic illustration 400 of an example container transporter and a container in accordance with one or more embodiments of the disclosure. Other embodiments may include additional or fewer components. The illustration of FIG. 4 is not to scale, and may not be illustrated to scale with respect to other figures. The container transporter illustrated in FIG. 4 may be the container transporter discussed with respect to FIGS. 1-3.

In FIG. 3, an additional example of a container transport 104 that can be included in particular embodiments of the container management system 100 of FIG. 1 is shown. The container transport 104 can include any and/or all of the components described in reference to FIGS. 1-3, however, the container transport 104 may include additional and/or alternative components. In various embodiments, the container transport 104 can include a container manipulation assembly 202 and a container conveyance assembly 204 mounted to support platform 206. The container manipulation assembly 202 can be mounted to the support platform 206 at a position above the container conveyance assembly 204. The container manipulation assembly can include a lateral actuator 230, one or more motors 236, and an engagement assembly 234. The lateral actuator 230 can move the engagement assembly 234 along length distance 216. For example, the lateral actuator 230 can move the engagement assembly 234 at least a portion of a distance from the first side of the container transport 104 to the second side of the container transport. The lateral actuator 230 and/or the engagement assembly 234 can be driven by one or more motors 236.

The engagement assembly 234 can include rotational actuator 302, arm 304, and engagement end 306. The rotational actuator 302 can rotate the arm 304 and the engagement end 306 between various positions. For example, the rotational actuator 302 can rotate the arm 304 and the engagement end 306 between a first position for engaging with containers 102 and a second position for movement of the container by the container conveyance assembly 204. In some embodiments, the rotational actuator 302 can rotate between 0 degrees and 180 degrees relative to horizontal and/or can rotate 360 degrees, although any other suitable range of motion may be utilized. The rotational actuator 302 can be or include a motor, a stepper motor, a rotational motor, and/or any suitable device for rotating the arm 304 and/or the engagement end 306. In some embodiments, one actuator may be configured to impart rotational motion to both the arms. For example, a single actuator may be coupled to both the first arm and the second arm via gearing that imparts motion generated by the actuator to both arms. In other embodiments, a single actuator may be used to generate translational and rotational motion for the device.

The arm 304 can connect the engagement end 306 with the rotational actuator 302. The arm 304 can have a length to engage the engagement end 306 with the container 102. In various embodiments, the arm 304 can have a variable length. For example, the arm 304 can have a first length to get out of the path of the container 102 when the container is being moved by the container conveyance assembly 204 and a second length when engaging with the container 102. In various embodiments, the arm 304 can be the same or similar to central support 242. In further embodiments, the arm 304 can be or include metal, plastic, carbon fiber, or another material with enough strength to move the container 102.

The engagement end 306 can engage with the container 102. For example, the engagement end 306 can be or include a hook shape and/or a curved surface for engaging with the container 102. For example, the engagement end 306 can engage with one or more protrusions on the container 102

(e.g., which may correspond to a handle or other grasping feature incorporated in the container). The engagement end 306 can be used to push and/or pull the container 102 onto the container transport 104. In various embodiments, the engagement end 306 can be or include one or more engagement surfaces 240. The engagement surfaces 240 can be shaped for engaging with the container 102. For example, the engagement surfaces 240 can have a hook shape and/or a curved shape to engage with the container 102. Additionally or alternatively, the engagement surfaces 240 can be or include a suction cup, a vacuum suction, a hook and loop connection, adhesives, and/or any material suitable for engaging with the container 102.

Figure 5:
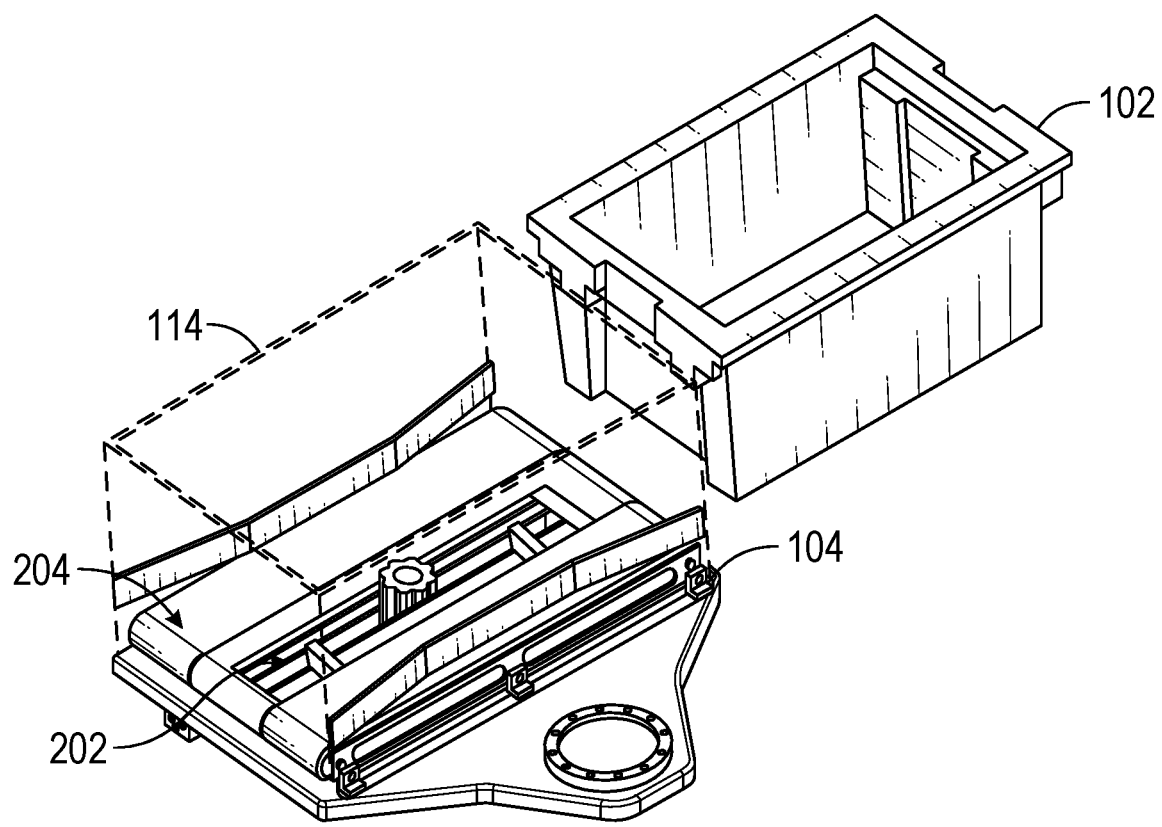
FIG. 5 is a schematic illustration of various states of components that may be implemented in a simplified example process for receiving, moving, and depositing a container in accordance with one or more embodiments of the disclosure.
Figure 5:
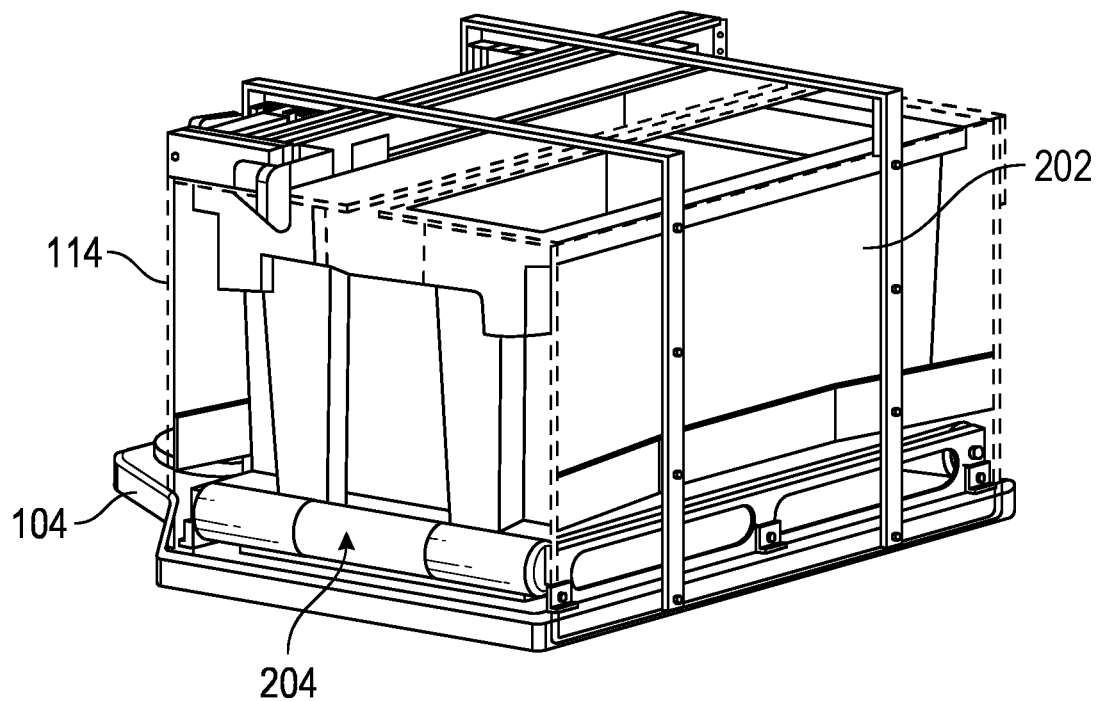

FIG. 5 is a schematic illustration of various states of components that may be implemented in a simplified example process for receiving, moving, and depositing a container in accordance with one or more embodiments of the disclosure. Other embodiments may include additional or fewer components. The illustration of FIG. 4 is not to scale, and may not be illustrated to scale with respect to other figures. The container transporter illustrated in FIG. 5 may be the container transporter discussed with respect to FIGS. 1-4.

In FIG. 5, the container transport 104 is depicted positioned next to a container 102. The container 102 can be positioned in the container holder 106 or may be positioned on another surface and/or held. The container transport 104 can be positioned next to the container 102 to substantially align the container with container passage 114. The container transport 104 can be positioned next to and aligned with the container 102 by the robotic manipulator 110, the mobile drive unit 108, and/or any device suitable for moving the container transport. The container manipulation assembly 202 may be moved to an engagement position for engagement with the container 102. For example, one or more arms of the container manipulation assembly 202 may be rotated such that the corresponding fingers are in a substantially vertical orientation, and the arms may be extended alongside the container. Once extended beyond an end of the container 102, the arms may be rotated towards each other, such that the respective fingers are pointing towards each other in a substantially horizontal orientation. The fingers may be used to pull the container 102 onto the conveyance assembly 204 to load the container 102 onto the container transporter. Fingers may be any protrusion extending from the shaft of the respective arm, and may be formed of any suitable material, such as metal, plastic, composite, or other materials. The fingers may extend from the shaft at an angle, such as a substantially perpendicular angle. Any number of fingers may be included and may extend from various positions along the shaft of the respective arms.

Figure 6:
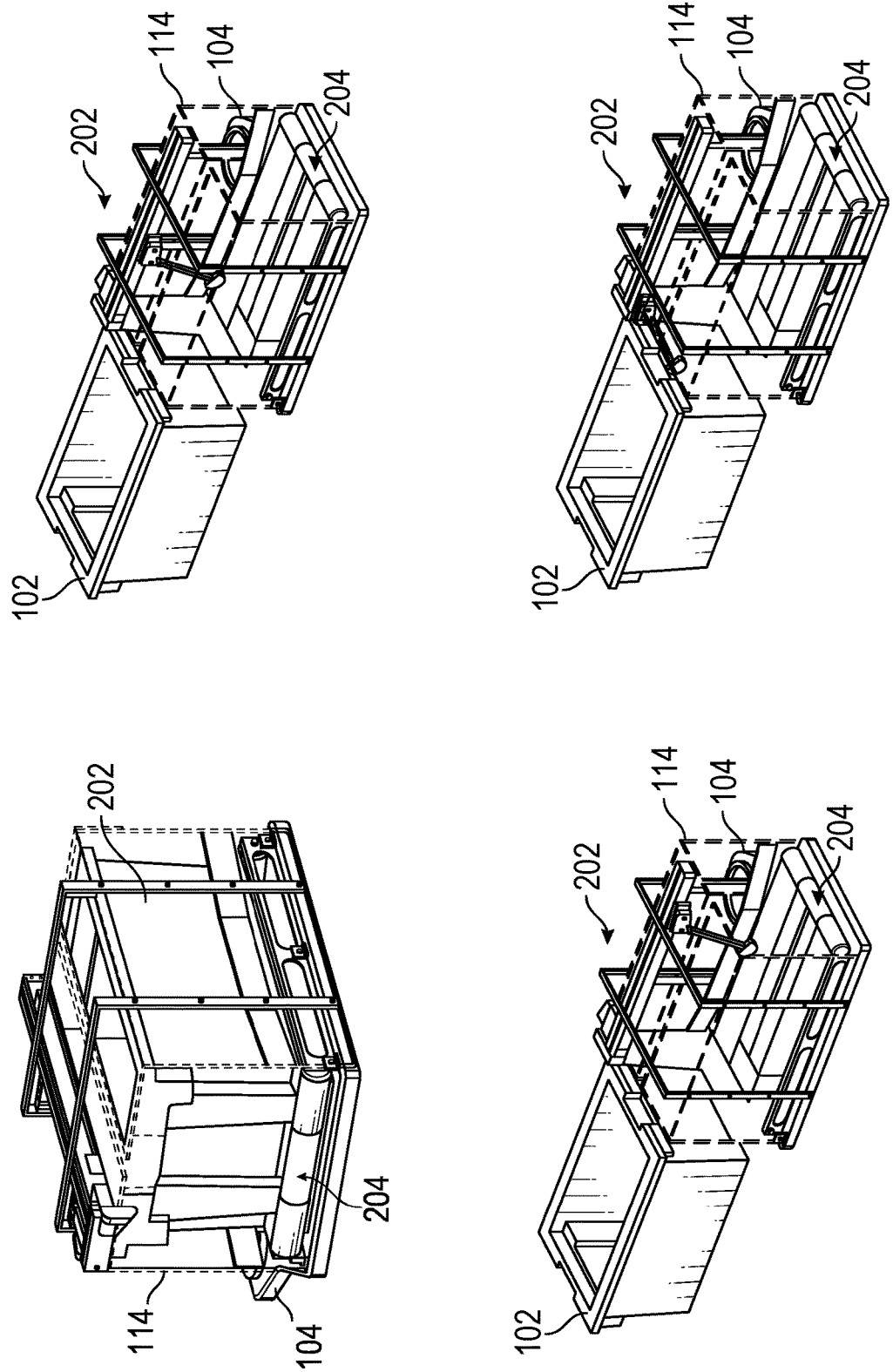
FIG. 6 is a schematic illustration of various states of components that may be implemented in a simplified example process for receiving, moving, and depositing a container in accordance with one or more embodiments of the disclosure.

FIG. 6 is a schematic illustration of various states of components that may be implemented in a simplified example process for receiving, moving, and depositing a container in accordance with one or more embodiments of the disclosure. Other embodiments may include additional or fewer components. The illustration of FIG. 6 is not to scale, and may not be illustrated to scale with respect to other figures. The container transporter illustrated in FIG. 5 may be the container transporter discussed with respect to FIGS. 1-5.

In some embodiments, the container conveyance assembly 204 can be operated to assist with advancing the container 102 onto the container conveyance assembly. The container 102 can be conveyed until some, all, or substantially all of the container is positioned in the container passage 114 and/or on the container conveyance assembly 204. The container 102 can be conveyed without the container manipulation assembly interfering with the container.

Once the container 102 is loaded, the robotic manipulator 110 may be operated to reposition the container transport 104 and the container 102. The robotic manipulator 110 can move the container transport 104 and the container 102 to a position for unloading of the container. The container 102 can be positioned inside or substantially inside the container passage 114 when the robotic manipulator 110 is repositioning the container transport 104 and the container. For example, the container 102 can be positioned on the container transport 104 at or near the position of the container shown in the illustrations of FIG. 6.

To unload the container 102, the container conveyance assembly 204 may be operated to advance the container 102 off of the container conveyance assembly. The container 102 can be conveyed until a portion of the container is off of the container conveyance assembly 204 and/or outside of the container passage 114. FIG. 6 illustrates the container 102 positioned partially off of the container conveyance assembly 204 and partially outside of the container passage 114. While the container 102 is being conveyed by the container conveyance assembly 204, the container manipulation assembly 202 may have the fingers of the respective arm in an upwards position, so as to avoid blocking the container 102 from being unloaded.

In some embodiments, the container manipulation assembly 202 may be operated to engage with the container 102. For example, if the container cannot be fully unloaded using the container conveyance assembly, the arms of the container manipulation assembly 202 may be operated to use the fingers to "nudge" or push a side of the container 102 to assist with unloading the container 102. The container manipulation assembly 202 can move in a lateral direction (e.g., length distance 216 from FIG. 4). The container manipulation assembly 202 can engage with the container 102 and begin to push the container off of the container conveyance assembly 204. In some embodiments, the container manipulation assembly 202 may be aided by the container conveyance assembly 204 to push the container 102.

The container manipulation assembly 202 can push the container 102 until the container and/or a portion of the container manipulation assembly is outside of the container passage 114. The container 102 may be pushed onto an output station 112 or other surface within a warehouse environment. The container 102 can be moved off of the container conveyance assembly 204 on a side opposite the side where the container was moved onto the conveyance assembly. For example, the container 102 can be moved onto a front side of the container conveyance assembly 204 and be moved off of a rear side of the conveyance assembly. However, the container 102 may be moved off of the container conveyance assembly 204 on the same side where the container was moved onto the conveyance assembly. For example, the container 102 may be moved onto the front side of the container conveyance assembly 204 and be moved off of the front side of the conveyance assembly. As an illustrative example, moving the container 102 on and off the same side of the container conveyance assembly 204 may facilitate moving the container 102 from an initial berth on a container holder 106 and into a subsequent berth at a different height, lateral position, and/or other variation in location.

In some embodiments, the container manipulation assembly 202 can disengage with the container 102 and return to a position where at least a portion of the container manipulation assembly is inside the container passage 114. The container manipulation assembly 202 can be positioned for alignment with another container 102 (e.g., a standby position).

FIG. 7 is a schematic illustration of a container transporter 300 in isolated view with a container in accordance with one or more embodiments of the disclosure. Other embodiments may include additional or fewer components. The illustration of FIG. 7 is not to scale, and may not be illustrated to scale with respect to other figures. The container transporter illustrated in FIG. 7 may be the container transporter discussed with respect to FIGS. 1-6.

The container transporter 300 depicted in FIG. 7 may be used instead of the container transporter depicted in FIGS. 2-6 in the same contextual environments and applications. For example, the container transporter 300 may be coupled to a robotic manipulator to retrieve, transport, and place containers. The container transporter 300 may be an item manipulation device, and may include one or more of the depicted components, as well as additional components as described herein with respect to the container transporter of FIGS. 1-6, such as a support housing and so forth.

The container transporter 300 may be configured to load, transport, and unload one or more containers 320. The container transporter 300 may include a support platform 330, a conveyance surface 340 attached to the support platform 330. The conveyance surface 340 may include one or more conveyors, such as conveyor belts. The conveyance surface 340 may be configured to convey the container 320 at least a portion of a distance from a first side of the support platform 330 to a second side of the support platform 330. The conveyance surface 340 may define at least a portion of a container passage through which the container 320 can be conveyed. The container transporter 300 may include a manipulator 310 that may be configured to push and/or pull the container 320. The manipulator 310 may include one or more arms, such as a first arm 370 disposed along a longitudinal axis of the container transporter 300 or item manipulation device, and a second arm 380 disposed along the longitudinal axis of the container transporter 300 or item manipulation device. The manipulator 310 may be engageable with the container 320 to move the container 320 at least partially onto and/or off of the conveyance surface 340.

Some of the arms of the manipulator 310 may include fingers. For example, the first arm 370 may include a first finger 372. The first finger 372 may be coupled to the first arm 370, and may be disposed at a substantially perpendicular angle with respect to a shaft of the first arm 370. Similarly, the second arm 380 may include a second finger 382. The second finger 382 may be coupled to the second arm 380, and may be disposed at a substantially perpendicular angle with respect to a shaft of the second arm 380. Fingers may be any protrusion extending from the shaft of the respective arm, and may be formed of any suitable material, such as metal, plastic, composite, or other materials. The fingers may extend from the shaft at an angle, such as a substantially perpendicular angle. Any number of fingers may be included and may extend from various positions along the shaft of the respective arms.

The respective arms may be rotatable, such that the respective fingers may rotate from the substantially horizontal position depicted in FIG. 7 to a substantially vertical position. The rotation of the fingers may allow for the arms to extend past the container 320, and then the fingers can be rotated to the horizontal position, and the arms retracted, so as to pull the container 320 towards the container transporter 300 using the fingers.

Accordingly, a first actuator 360 may be included to rotate the first arm about a longitudinal axis of the container transporter 300, and a second actuator 362 may be included to rotate the second arm about the longitudinal axis of the container transporter 300. The arms may be rotated in opposite directions. For example, the direction of rotation of the first arm 370 is depicted in FIG. 7. The direction of rotation of the second arm 380 may be in the opposite direction.

The container transporter 300 may include an actuator 350, such as a ball screw actuator, a linear actuator, an electric motor, a solenoid, a pneumatic actuator, or a different type of actuator, that is configured to move the arms of the manipulator 310 back and forth in directions 312. The first arm 370 and the second arm 380 may therefore be actuated outwards from the container transporter 300 and back towards the container transporter 300 using the actuator 350.

To handle containers, the container transporter 300 may be coupled to a computer system or controller that may cause the container transporter 300 to perform one or more of the operations in process flow 390. For example, at block 392, the controller may cause the container transporter 300 to rotate the fingers of the arms to a vertical position. Accordingly, the controller may cause the first arm 370 to rotate, via the first actuator 360, such that the first finger 372 is in a substantially vertical orientation, and may cause the second arm 380 to rotate, via the second actuator 362, such that the second finger 382 is in a substantially vertical orientation.

At block 394, the controller may cause the container transporter 300 to extend the arms. For example, the controller may cause the first arm 370 to extend, via the actuator 350, from a first position (e.g., the position depicted in FIG. 7) along direction 312 to a second position (e.g., in which the first finger 372 is behind the container 320, etc.). The controller may cause the second arm 380 to extend, via the actuator 350, from the first position to the second position.

At block 396, the controller may cause the container transporter 300 to rotate the fingers of the arms to a horizontal position. Accordingly, the controller may cause the first arm 370 to rotate, via the first actuator 360, such that the first finger 372 is in a substantially horizontal orientation, such as that depicted in FIG. 7, and may cause the second arm 380 to rotate, via the second actuator 362, such that the second finger 382 is in a substantially horizontal orientation.

At block 398, the controller may cause the container transporter 300 to retract the arms, such that the fingers pull a container onto the device. For example, the controller may cause the first arm 370 to retract, via the actuator 350, from the second position to the first position. The controller may cause the second arm 380 to retract, via the actuator 350, from the second position to the first position. The first finger 372 and the second finger 382 may be configured to pull the container 320 as the first arm 370 and the second arm 380 retract while the respective fingers are in the horizontal position.

To unload containers, the conveyance assembly may be actuated. In some embodiments, containers may be unloaded using the manipulator 310. For example, the container may be pushed off of the container transporter 300 using the fingers. In such embodiments, the container may be pushed off a side of the container transporter 300 opposite the side from which the container was loaded, due to the location of the fingers on one side of the arms. The arms may therefore extend out from the container transporter 300 in either direction. In embodiments where the arms are used to unload containers, the containers may only be loaded from one side of the container transporter 300 (e.g., the side on which the fingers are located), and unloaded from one side (e.g., the side opposite the loading side). In other embodiments, the conveyance assembly may be used to unload containers, and the fingers may be used to nudge containers once unloaded to ensure the containers are securely positioned.

Figure 8:
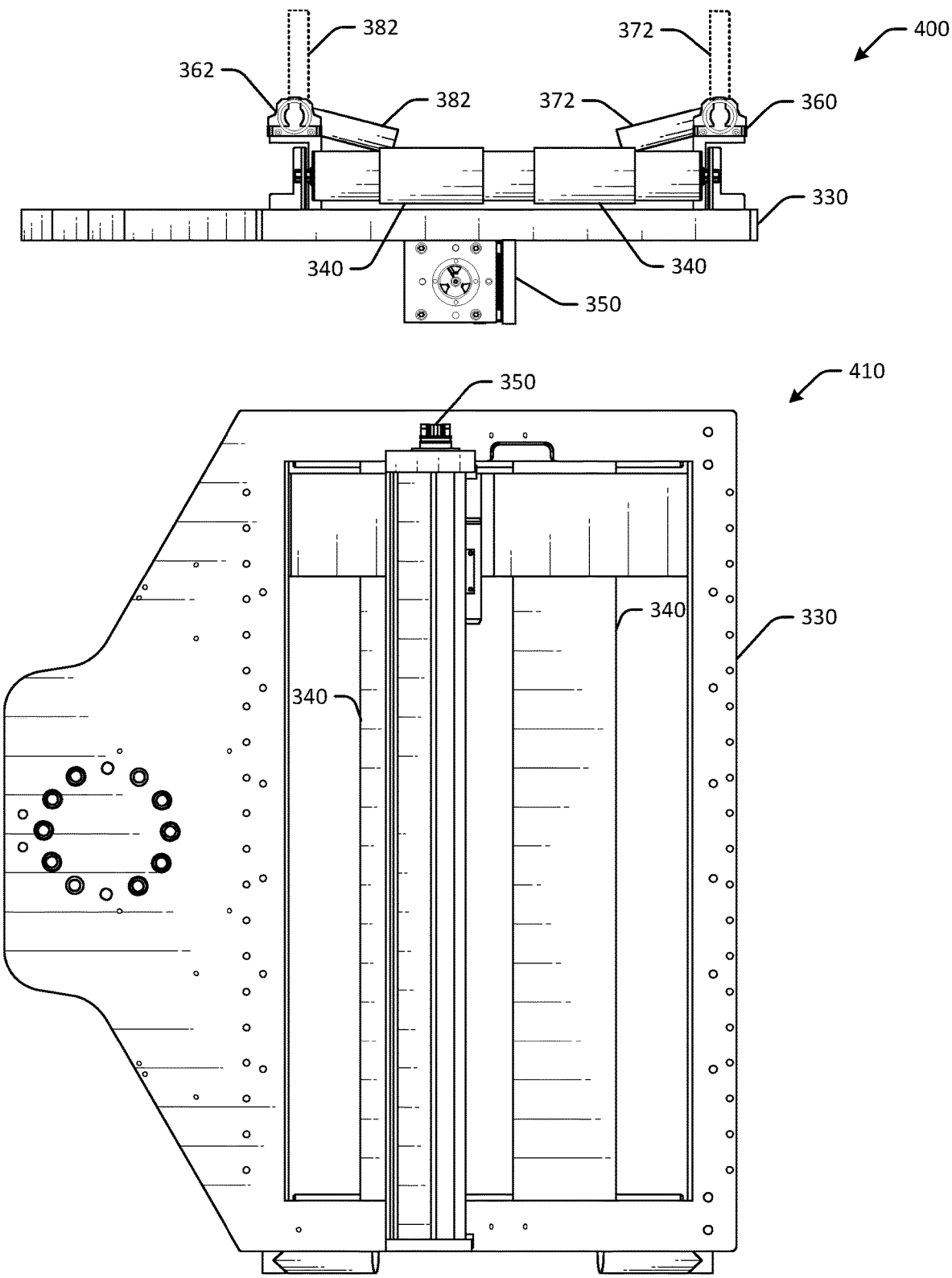
FIGS. 8-9 are schematic illustrations of various views of the container transporter of FIG. 7 in accordance with one or more embodiments of the disclosure.
Figure 9:
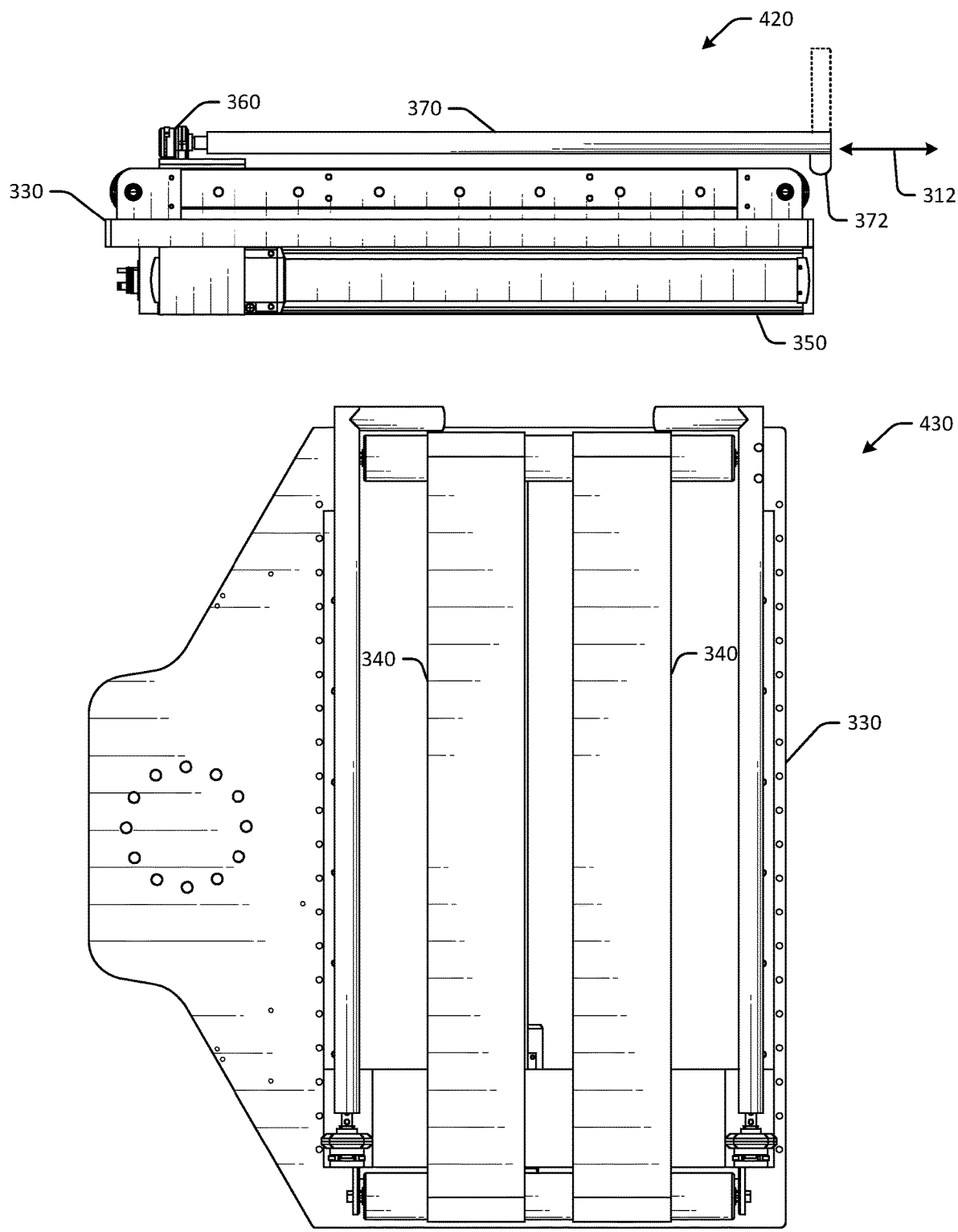

FIGS. 8-9 are schematic illustrations of various views of the container transporter of FIG. 7 in accordance with one or more embodiments of the disclosure. Other embodiments may include additional or fewer components. The illustration of FIGS. 8-9 are not to scale, and may not be illustrated to scale with respect to other figures. Other embodiments may have different components.

In FIG. 8, the container transporter of FIG. 7 is depicted in a front view 400 and a bottom view 410. In the front view 400, the respective arms of the container transporter 300 are depicted in a default orientation and a rotated orientation. In the default orientation, the fingers of the arms may be in the lowered position or substantially horizontal position (as illustrated in solid lines). In the rotated orientation, the fingers of the arms may be in a raised position or substantially vertical position (as illustrated in dashed lines). Accordingly, the first finger 372 may be in a raised position or vertical position when the first arm 370 is rotated, and the second finger 382 may be in a raised position or vertical position when the second arm 380 is rotated. In some embodiments, the first arm 370 may be configured to rotate at least 90 degrees, and the second arm 380 may be configured to rotate at least 90 degrees. The arms may be rotated back to the horizontal position, so as to allow the first finger 372 and the second finger 382 to pull the container onto the conveyance surface at the first side of the support platform 330 of the container transporter 300 Similarly, in some embodiments, the first finger 372 and the second finger 382 may be configured to push the container off the conveyance surface at the first side or the second side (opposite the first side) of the support platform 330 of the container transporter 300. In such embodiments, the arms may be configured to extend from the container transporter 300 in either direction (e.g., extend out from the first side or the second side of the container transporter 300, etc.). As depicted in the bottom view 410, the actuator 350 may run laterally along some or all of a length of the support platform 330. In some embodiments, the actuator 350 may be configured to impart motion to one or more of the arms of the container transporter 300. For example, the actuator 350 may be configured to cause the arms to move back and forth along the support platform 330, and may optionally be configured to cause the arms to rotate instead of, or in addition to, rotational actuators 360, 362.

In FIG. 9, the container transporter 300 is depicted in a right side view 420 and a top view 430. In the right side view 420, the first finger 372 is depicted in the lowered position in solid line, and in the raised position in dashed lines. The first arm 370 and the second arm 380 may extend and retract from the container transporter 300 in directions 312 to handle containers, such as to load and/or unload containers from the container transporter 300. In the top view 430, the arms are depicted in a default position or retracted position. In the retracted position, the arms may be configured to secure a container loaded on the container transporter 300 during transport. For example, the respective fingers of the arm may prevent the container from moving off of the container transporter 300 during transport.

Figure 10:
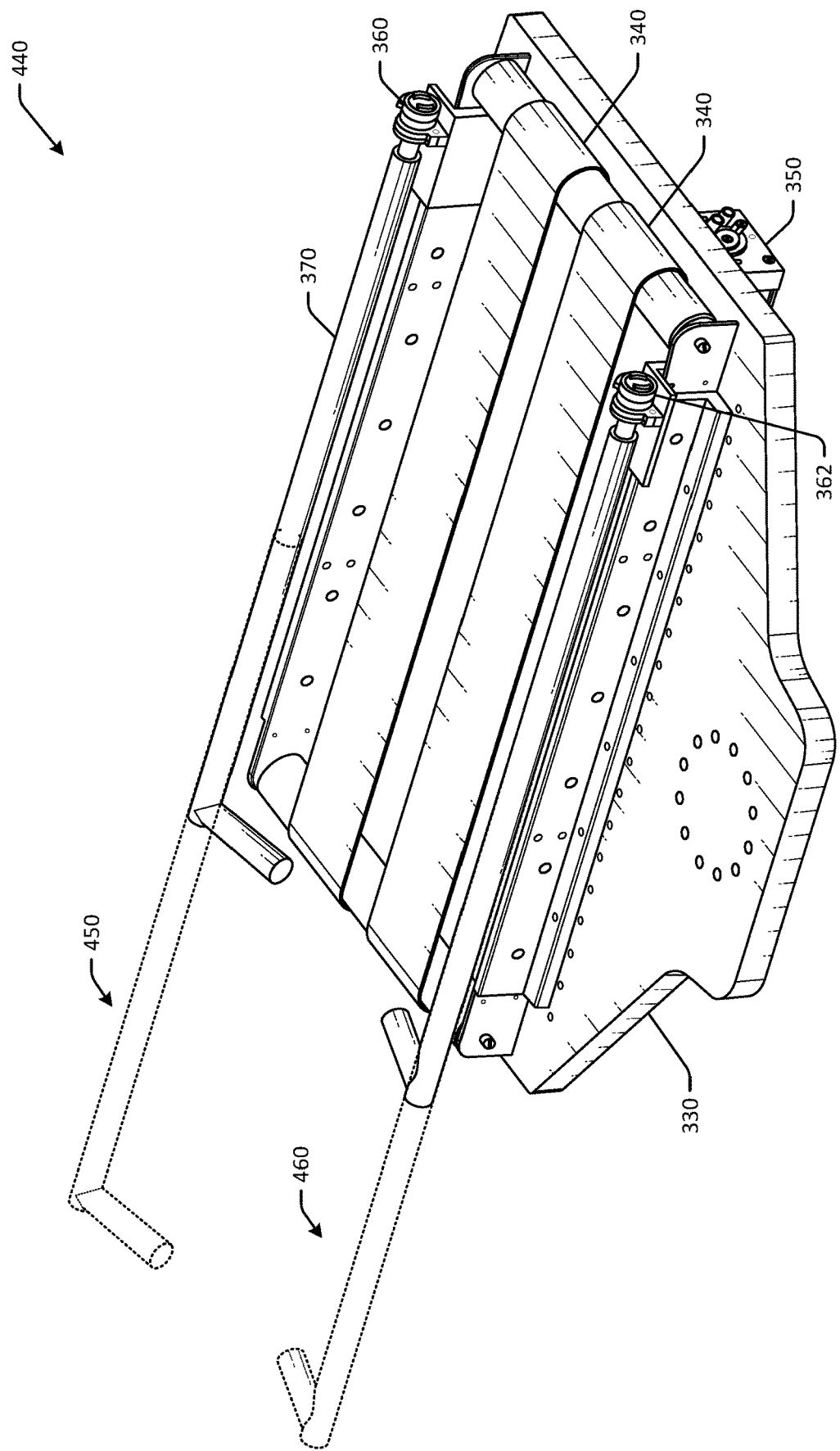
FIG. 10 is a schematic illustration of the container transporter of FIG. 7 with arms in an extended position in accordance with one or more embodiments of the disclosure.
Figure 11:
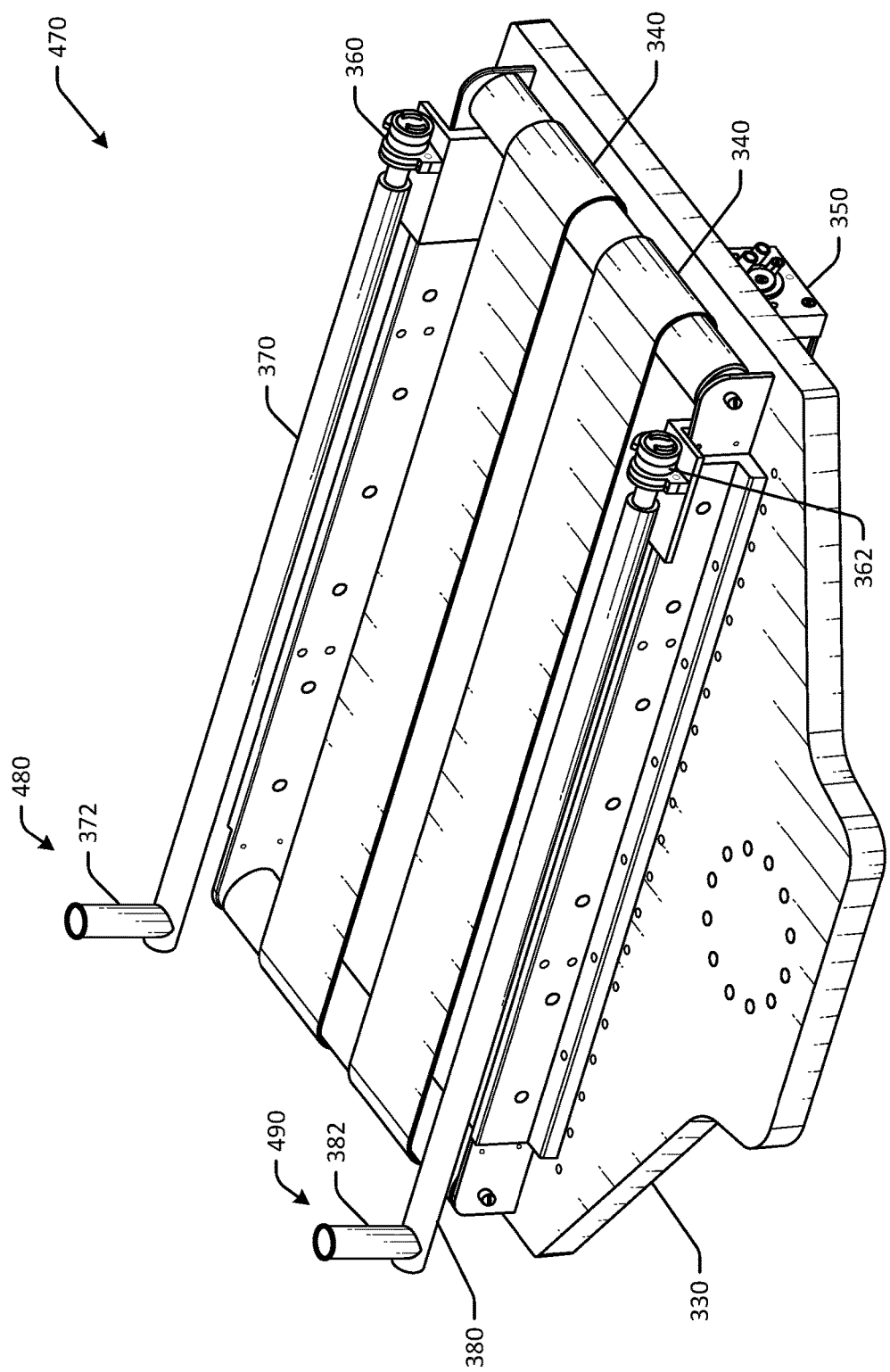
FIG. 11 is a schematic illustration of the container transporter of FIG. 7 with fingers in an upwards position in accordance with one or more embodiments of the disclosure.

FIGS. 10-11 are schematic illustrations of various views of the container transporter of FIG. 7 in accordance with one or more embodiments of the disclosure. Other embodiments may include additional or fewer components. The illustration of FIGS. 10-11 are not to scale, and may not be illustrated to scale with respect to other figures. Other embodiments may have different components.

In FIG. 10, the container transporter 300 of FIG. 7 is depicted in a perspective view 440 with the respective arms in an extended position. Specifically, the first arm 370 is depicted in an extended position 450, and the second arm 380 is depicted in an extended position 460. The first arm 370 and the second arm 380 may extend in either or both direction from the container transporter 300. During extension, the first arm 370 and the second arm 380 may be rotated such that the respective fingers are in a vertical orientation, thereby allowing the arms to move along the sides of a container. Once the arms are fully extended and/or otherwise extended past the end of a container, the arms may be rotated such that the respective fingers are in a horizontal position, and the arms may then be retracted, so as to pull the container towards the container transporter 300.

In some embodiments, the container transporter 300 may include a first actuator, such as the actuator 350, that is configured to move the first arm 370 and the second arm 380 along the longitudinal axis of the container transporter 300 (e.g., along directions 312). The container transporter 300 may include an optional second actuator, such as the actuator 360, that is configured to rotate the first arm 370 about the longitudinal axis, and an optional third actuator, such as the actuator 362, that is configured to rotate the second arm 380 about the longitudinal axis. In embodiments where the arms can extend only from one side of the container transporter 300, the arms of the container manipulator may be configured to load containers from only the first side of the support platform 330, and the conveyance assembly unload containers from only the second side of the platform.

In FIG. 11, the container transporter 300 is depicted with the fingers of the first arm 370 and the second arm 380 in an upwards position. Specifically, the first finger 372 is depicted in an upwards position 480, and the second finger 382 is depicted in an upwards position 490. In the upwards position, a container can be unloaded from either side of the container transporter 300 via the conveyance mechanism. The manipulator of the container transporter 300 may therefore include the first arm 370 having the first finger 372 disposed at an end of the first arm 370, where the first arm is configured to both rotate about the longitudinal axis, and to translate along the longitudinal axis (e.g., via the actuator 350, etc.). The second arm 380 may have a second finger 382 disposed at an end of the second arm 380, and the second arm 380 may be configured to both rotate about the longitudinal axis, and to translate along the longitudinal axis (e.g., via the actuator 350, etc.).

The container transporter 300 or item manipulation device may be coupled to a robotic arm or other robotic manipulator that is configured to move the item manipulation device from a first position to a second position, such as from a container pod to a takeaway conveyor or other destination.

In some embodiments, the controller of the container transporter 300 may be configured to cause the first arm 370 to extend from the first position, such as a default position, to a second position (e.g., extended from a first side of the container transporter 300 in a first direction) and/or a third position (e.g., extended from a second side of the container transporter 300 in an opposite direction relative to the first direction, etc.). The controller may cause the second arm to extend from the first position to the second position or the third position as well. The first finger 372 and the second finger 382 may be configured to push the container in the opposite direction as the first arm 370 and the second arm 380 extend. If the controller determines that the container is not fully secured in a container slot, the controller may cause the first arm and/or the second arm to nudge the container using the first finger 372 and the second finger 382. In some embodiments, the controller may be configured to cause the first arm 370 to extend from the first position to a third position in an opposite direction relative to the first direction, and may cause the second arm to extend from the first position to the third position in the opposite direction. The first finger 372 and the second finger 382 may be configured to push the container in the opposite direction as the first arm 370 and the second arm 380 extend.

One or more operations of the methods, process flows, or use cases of FIGS. 1-11 may have been described above as being performed by a user device, or more specifically, by one or more program module(s), applications, or the like executing on a device. It should be appreciated, however, that any of the operations of the methods, process flows, or use cases of FIGS. 1-11 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-11 may be described in the context of the illustrative devices, it should be appreciated that such operations may be implemented in connection with numerous other device configurations.

The operations described and depicted in the illustrative methods, process flows, and use cases of FIGS. 1-11 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 12:
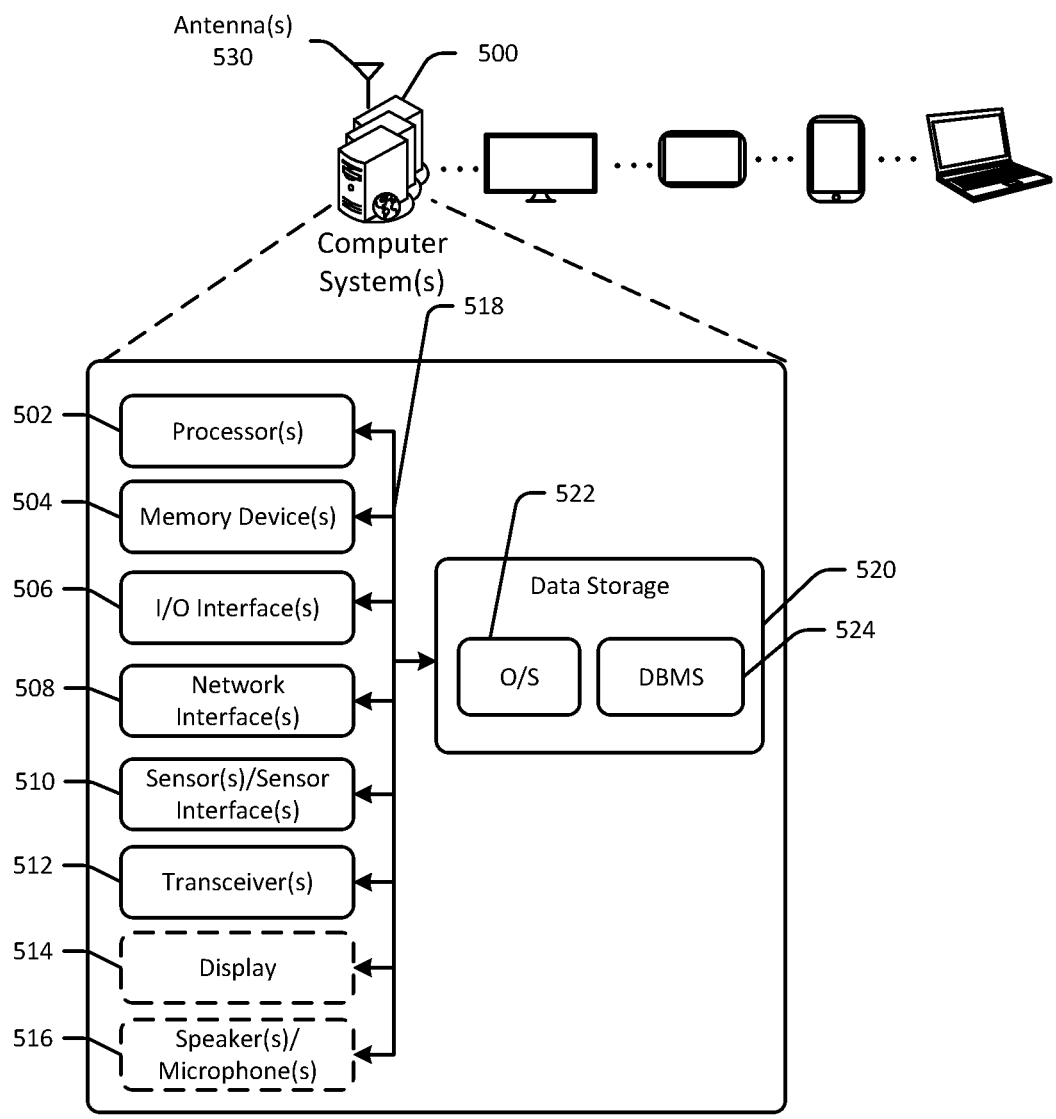
FIG. 12 schematically illustrates an example architecture of a computer system associated with a container transporter system in accordance with one or more embodiments of the disclosure.

FIG. 12 is a schematic block diagram of one or more illustrative computer system(s) 500 in accordance with one or more example embodiments of the disclosure. The computer system(s) 500 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 500 may correspond to an illustrative device configuration for the device(s) of FIGS. 1-11. For example, the computer system(s) 500 may control one or more aspects of the container transporters described in FIGS. 1-11, such as determining when to actuate certain components, when to extend or retract arms, when to rotate fingers, where a robotic arm or other device is to position a picking assembly, and so forth.

The computer system(s) 500 may be configured to communicate with one or more servers, user devices, cameras, or the like. The computer system(s) 500 may be configured to identify items, retrieve items or containers, move items or containers, and so forth.

The computer system(s) 500 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 500 may include one or more processors (processor(s)) 502, one or more memory devices 504 (also referred to herein as memory 504), one or more input/output (I/O) interface(s)

506, one or more network interface(s) 508, one or more sensor(s) or sensor interface(s) 510, one or more transceiver(s) 512, one or more optional display(s) 514, one or more optional microphone(s) 516, and data storage 520. The computer system(s) 500 may further include one or more bus(es) 518 that functionally couple various components of the computer system(s) 500. The computer system(s) 500 may further include one or more antenna(s) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit the exchange of information (e.g., data (including computer-executable code), signaling, etc.) between various components of the computer system(s) 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 504 of the computer system(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 504 and the data storage 520, removable and/or non-removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to the data storage 520 for non-volatile storage.

More specifically, the data storage 520 may store one or more operating systems (O/S) 522; one or more database management systems (DBMS) 524; and one or more program module(s), applications, engines, computer-executable code, scripts, or the like. Some or all of these module(s) may be sub-module(s). Any of the components depicted as being stored in the data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in the data storage 520 may support functionality described in reference to corresponding components named earlier in this disclosure.

The data storage 520 may further store various types of data utilized by the components of the computer system(s) 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 502 may be configured to access the memory 504 and execute the computer-executable instructions loaded therein. For example, the processor(s) 502 may be configured to execute the computer-executable instructions of the various program module(s), applications, engines, or the like of the computer system(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to other illustrative components depicted as being stored in the data storage 520, the O/S 522 may be loaded from the data storage 520 into the memory 504 and may provide an interface between other application software executing on the computer system(s) 500 and the hardware resources of the computer system(s) 500. More specifically, the O/S 522 may include a set of computer-executable instructions for managing the hardware resources of the computer system(s) 500 and for providing common services to other application programs (e.g., managing memory allocation among various application programs). In certain example embodiments, the O/S 522 may control execution of the other program module(s). The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 500 is a mobile device, the DBMS 524 may be any suitable lightweight DBMS optimized for performance on a mobile device.

Referring now to other illustrative components of the computer system(s) 500, the input/output (I/O) interface(s) 506 may facilitate the receipt of input information by the computer system(s) 500 from one or more I/O devices as well as the output of information from the computer system(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(s) 530 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 500 may further include one or more network interface(s) 508 via which the computer system(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(s) 530 may include any suitable type of antenna depending, for example, on the communications protocols used to transmit or receive signals via the antenna(s) 530. Non-limiting examples of suitable antennas may include directional antennas, non-directional antennas, dipole antennas, folded dipole antennas, patch antennas, multiple-input multiple-output (MIMO) antennas, or the like. The antenna(s) 530 may be communicatively coupled to one or more transceivers 512 or radio components to which or from which signals may be transmitted or received.

As previously described, the antenna(s) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 530 may be configured to transmit or receive radio frequency signals within any suitable frequency range forming part of the unlicensed portion of the radio spectrum.

The antenna(s) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(s) 530—transmitting or receiving radio frequency (RF) signals in the bandwidth and/or channels corresponding to the communications protocols utilized by the computer system(s) 500 to communicate with other devices. The transceiver(s) 512 may include hardware, software, and/or firmware for modulating, transmitting, or receiving—potentially in cooperation with any of antenna(s) 530—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the computer system(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 514 may be configured to output light and/or render content. The optional speaker(s)/microphone(s) 516 may be any device configured to receive analog sound input or voice data.

It should be appreciated that the program module(s), applications, computer-executable instructions, code, or the like depicted in FIG. 12 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 500, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 12 may be implemented, at least partially, in hardware and/or firmware across any number of devices.

It should further be appreciated that the computer system(s) 500 may include alternate and/or additional hardware, software, or firmware components beyond those described or depicted without departing from the scope of the disclosure. More particularly, it should be appreciated that software, firmware, or hardware components depicted as forming part of the computer system(s) 500 are merely illustrative and that some components may not be present or additional components may be provided in various embodiments. While various illustrative program module(s) have been depicted and described as software module(s) stored in the data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a robotic arm; and
   an item manipulation device coupled to the robotic arm, the item manipulation device comprising:
      a support platform having an attachment point configured to engage with and be supported by the robotic arm, wherein the attachment point comprises a quick-attachment connector configured to couple with a mating quick-attachment connector of the robotic arm;
      a conveyance assembly coupled with the support platform and comprising a conveyance surface configured to receive a container on the conveyance surface for transporting the container between a front side and a rear side of a container passage having a bottom side at least partially defined by the conveyance surface;
      a container manipulator assembly coupled with the support platform, the container manipulator assembly comprising:
         a first arm disposed along a longitudinal axis of the item manipulation device; and
         a second arm disposed along the longitudinal axis of the item manipulation device, wherein the container manipulator assembly is engageable with the container to move the container at least partially onto the conveyance surface; and
      an actuation assembly configured to move the first arm and the second arm between outside the container passage and inside the container passage and across the front side or the rear side of the container passage so as to move the container through the respective front side or rear side of the container passage and at least partially onto the conveyance surface.

2. The system of claim 1, wherein the first arm comprises a first finger disposed at an end of the first arm, and wherein the first arm is configured to both rotate about the longitudinal axis, and to translate along the longitudinal axis; and wherein second arm comprises a second finger disposed at an end of the second arm, and wherein the second arm is configured to both rotate about the longitudinal axis, and to translate along the longitudinal axis.

3. The system of claim 2, further comprising:
   a controller configured to:
      cause the first arm to rotate such that the first finger is in a substantially vertical orientation;
      cause the second arm to rotate such that the second finger is in a substantially vertical orientation;
      cause the first arm to extend from a first position to a second position;
      cause the second arm to extend from the first position to the second position;
      cause the first arm to rotate such that the first finger is in a substantially horizontal orientation;
      cause the second arm to rotate such that the second finger is in a substantially horizontal orientation;
      cause the first arm to retract from the second position to the first position; and
      cause the second arm to retract from the second position to the first position;
   wherein the first finger and the second finger are configured to pull the container as the first arm and the second arm retract.

4. An item manipulation device comprising:
   a support platform;
   a conveyance surface attached to the support platform and configured to convey a container at least a portion of a distance from a first side of the support platform to a second side of the support platform, wherein the conveyance surface defines at least a portion of a container passage through which a container can be conveyed;
   a manipulator comprising a first arm disposed along a longitudinal axis of the item manipulation device, the first arm comprising a first finger disposed at an end of the first arm, and a second arm disposed along the longitudinal axis of the item manipulation device, the second arm comprising a second finger disposed at an end of the second arm, wherein the manipulator is engageable with the container to move the container at least partially onto the conveyance surface; and a controller configured to:
cause the first arm to rotate such that the first finger is in a substantially horizontal orientation;
cause the second arm to rotate such that the second finger is in a substantially horizontal orientation;
cause the first arm to retract from the second position to the first position; and
cause the second arm to retract from the second position to the first position.

5. The item manipulation device of claim 4, wherein the first arm is configured to both rotate about the longitudinal axis, and to translate along the longitudinal axis; and
wherein the second arm is configured to both rotate about the longitudinal axis, and to translate along the longitudinal axis.

6. The item manipulation device of claim 5, wherein the first arm is configured to rotate at least 90 degrees, and the second arm is configured to rotate at least 90 degrees.

7. The item manipulation device of claim 5, wherein the first finger and the second finger are configured to pull the container onto the conveyance surface at the first side of the support platform.

8. The item manipulation device of claim 7, wherein the first finger and the second finger are configured to push the container off the conveyance surface at the first side of the support platform.

9. The item manipulation device of claim 5, wherein the controller is further configured to:
cause the first arm to rotate such that the first finger is in a substantially vertical orientation;
cause the second arm to rotate such that the second finger is in a substantially vertical orientation;
cause the first arm to extend from a first position to a second position; and
cause the second arm to extend from the first position to the second position;
wherein the first finger and the second finger are configured to pull the container as the first arm and the second arm retract.

10. The item manipulation device of claim 9, wherein the controller is further configured to:
cause the first arm to extend from the first position to a third position in an opposite direction relative to a direction of the second position; and
cause the second arm to extend from the first position to the third position in the opposite direction;
wherein the first finger and the second finger are configured to push the container in the opposite direction as the first arm and the second arm extend.

11. The item manipulation device of claim 9, wherein the controller is further configured to:
determine that the container is not fully secured in a container slot; and
nudge the container using the first finger and the second finger.

12. The item manipulation device of claim 4, further comprising:
a first actuator configured to move the first arm and the second arm along the longitudinal axis;
a second actuator configured to rotate the first arm about the longitudinal axis; and
a third actuator configured to rotate the second arm about the longitudinal axis.

13. The item manipulation device of claim 4, further comprising one or more sensors for obtaining data associated with the container, the one or more sensors comprising at least one of an optical sensor, a camera, a scanner, or a weight sensor.

14. The item manipulation device of claim 4, wherein the conveyance surface is an active surface that comprises one or more driven rollers or driven belts.

15. The item manipulation device of claim 4, wherein the item manipulation device is coupled to a robotic arm that is configured to move the item manipulation device from a first position to a second position.

16. A method comprising:
causing a first arm of an item manipulation device to rotate such that a first finger of the first arm is in a substantially vertical orientation;
causing a second arm of the item manipulation device to rotate such that a second finger of the second arm is in a substantially vertical orientation;
causing the first arm to extend from a first position to a second position;
causing the second arm to extend from the first position to the second position;
causing the first arm to rotate such that the first finger is in a substantially horizontal orientation;
causing the second arm to rotate such that the second finger is in a substantially horizontal orientation;
causing the first arm to retract from the second position to the first position; and
causing the second arm to retract from the second position to the first position, wherein the first finger and the second finger are configured to pull a container as the first arm and the second arm retract.

17. The method of claim 16, further comprising:
causing the first arm to extend from the first position to a third position in an opposite direction; and
causing the second arm to extend from the first position to the third position in the opposite direction, wherein the first finger and the second finger are configured to push the container in the opposite direction as the first arm and the second arm extend.

18. The method of claim 16, further comprising:
determining that the container is not fully secured in a container slot; and
nudging the container using the first finger and the second finger.

19. The method of claim 16, wherein the manipulator is configured to load containers from only the first side of the support platform and unload containers from only the second side of the platform.

* * * * *